United States Patent [19]

Yoshida

[11] Patent Number: 5,596,629
[45] Date of Patent: Jan. 21, 1997

[54] DATA TRANSMISSION OVER A COMMUNICATION LINE

[75] Inventor: Takehiro Yoshida, Tokyo, Japan

[73] Assignee: Canon Kabushiki Kaisha, Tokyo, Japan

[21] Appl. No.: 183,905

[22] Filed: Jan. 21, 1994

Related U.S. Application Data

[63] Continuation of Ser. No. 815,869, Jan. 3, 1992, abandoned, which is a continuation of Ser. No. 487,130, Mar. 2, 1990, abandoned.

[30] Foreign Application Priority Data

Mar. 7, 1989 [JP] Japan .................................. 1-52776

[51] Int. Cl.$^6$ ........................... H04M 1/64; H04M 11/08
[52] U.S. Cl. ................................... 379/100; 379/67
[58] Field of Search ........................ 379/67, 88, 100 379/93, 98

[56] References Cited

U.S. PATENT DOCUMENTS

| | | | |
|---|---|---|---|
| 4,353,097 | 10/1982 | Takeda et al. | 358/287 |
| 4,502,080 | 2/1985 | Tsuda | 379/100 |
| 4,567,322 | 1/1986 | Tsuda | 379/100 |
| 4,677,660 | 6/1987 | Yoshida | 379/100 |
| 4,729,033 | 3/1988 | Yoshida | 379/100 X |
| 4,773,080 | 9/1988 | Nakajima et al. | 375/5 |
| 4,800,439 | 1/1989 | Yoshino | 379/100 X |
| 4,811,385 | 3/1989 | Watanabe | 379/100 |
| 4,815,121 | 3/1989 | Yoshida | 379/67 |
| 4,823,375 | 4/1989 | Yoshino | 379/100 |
| 4,868,865 | 9/1989 | Ogawa et al. | 379/100 |
| 4,885,755 | 12/1989 | Yoshida | 375/58 |
| 4,901,343 | 2/1990 | Yamaguchi | 379/93 |
| 4,908,851 | 3/1990 | Kotani et al. | 379/100 |
| 4,910,506 | 3/1990 | Yoshida et al. | 340/825.07 |
| 4,910,764 | 3/1990 | Bowen | 379/100 |
| 4,916,607 | 4/1990 | Teraichi et al. | 364/200 |
| 4,932,048 | 6/1990 | Kenmochi et al. | 379/67 |
| 4,937,857 | 6/1990 | Yamashita et al. | 379/210 |
| 4,953,199 | 8/1990 | Hoshi et al. | 379/93 |
| 5,077,786 | 12/1991 | Hashimoto | 379/100 |

FOREIGN PATENT DOCUMENTS

| | | | |
|---|---|---|---|
| 0170277 | 10/1983 | Japan | 379/100 |
| 0025466 | 2/1984 | Japan | 379/98 |
| 0281657 | 12/1987 | Japan | 379/100 |
| 0063262 | 3/1988 | Japan | 379/100 |
| 0082156 | 4/1988 | Japan | 379/100 |
| 0148767 | 6/1988 | Japan | H04N 1/32 |
| 0148750 | 6/1988 | Japan | 379/100 |
| 0256047 | 10/1988 | Japan | 379/100 |
| 0245169 | 10/1988 | Japan | 379/100 |
| 0004157 | 1/1989 | Japan | 379/100 |
| 0034048 | 2/1989 | Japan | 379/100 |
| 0051861 | 2/1989 | Japan | 379/100 |
| WO87/07802 | 12/1987 | WIPO | 379/100 |

*Primary Examiner*—Thomas W. Brown
*Attorney, Agent, or Firm*—Fitzpatrick, Cella, Harper & Scinto

[57] ABSTRACT

A data communication apparatus includes a data communication section, a calling section for calling a desired destination, a manual instruction section for issuing a manual instruction for starting data communication after calling by the calling section, and a section for transmitting a recognition signal indicating that a calling station is a non-voice terminal after calling by the calling section. In a manual communication mode for performing data communication according to the manual instruction, the recognition signal is sent in response to the manual instruction.

13 Claims, 7 Drawing Sheets

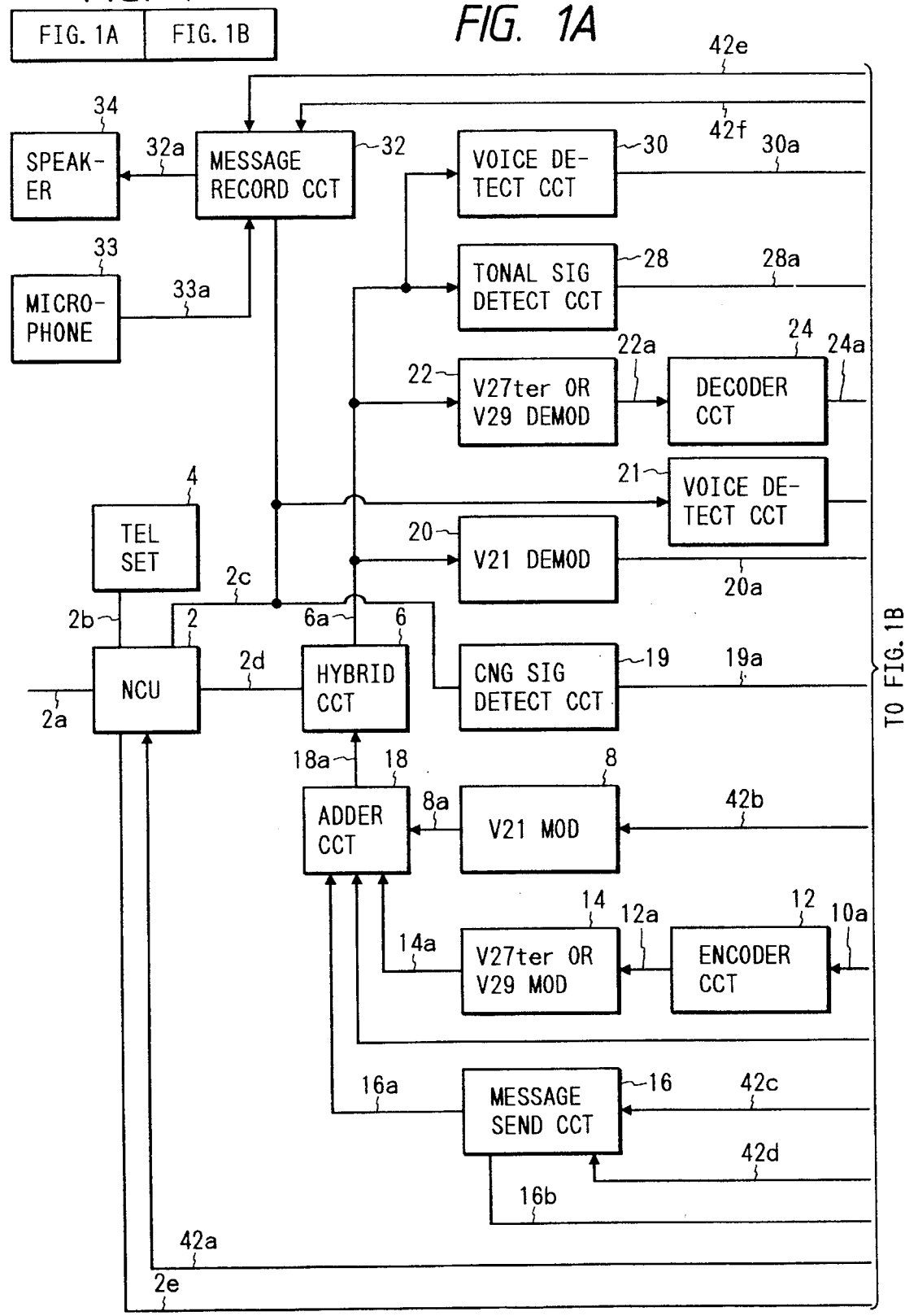

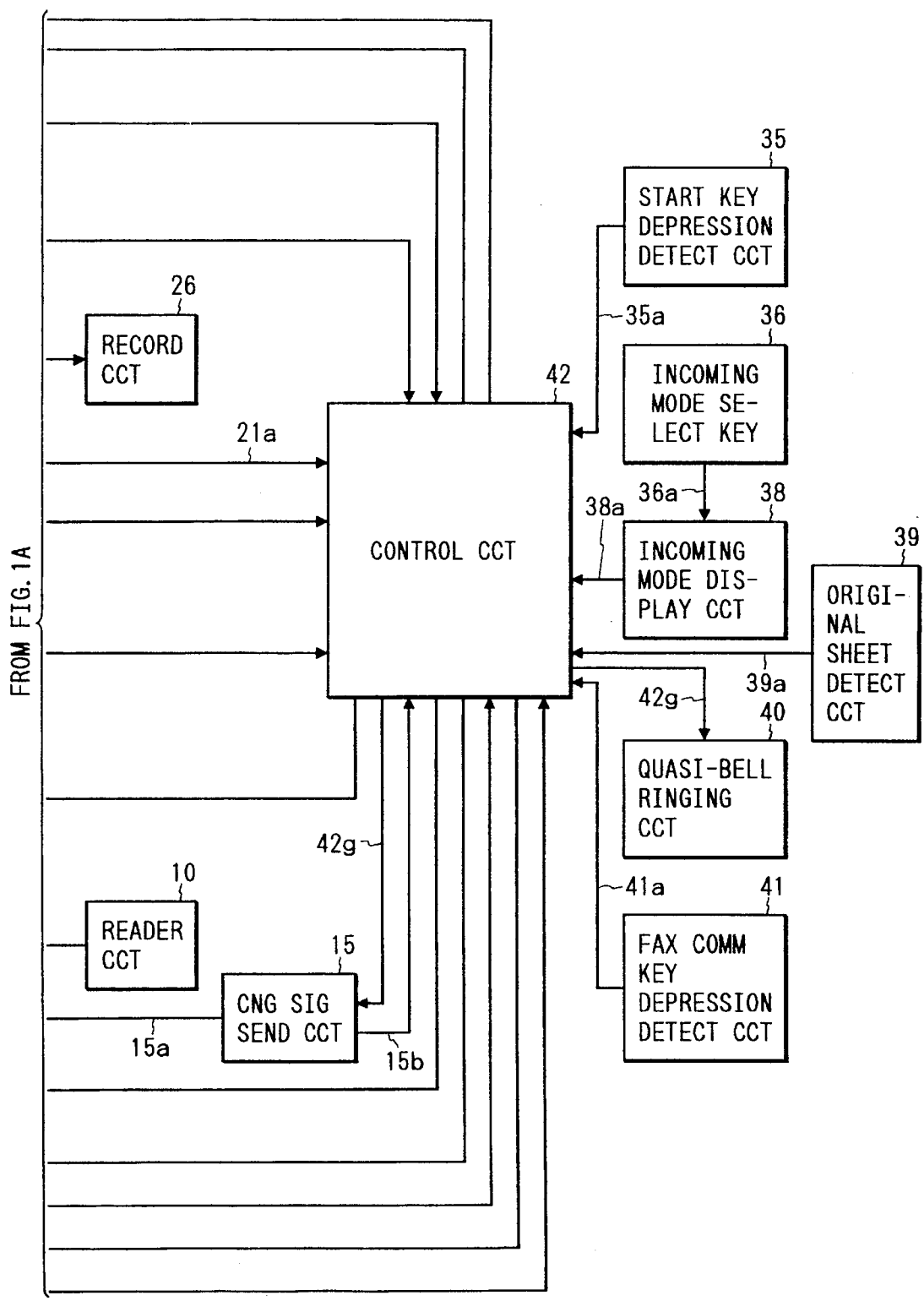

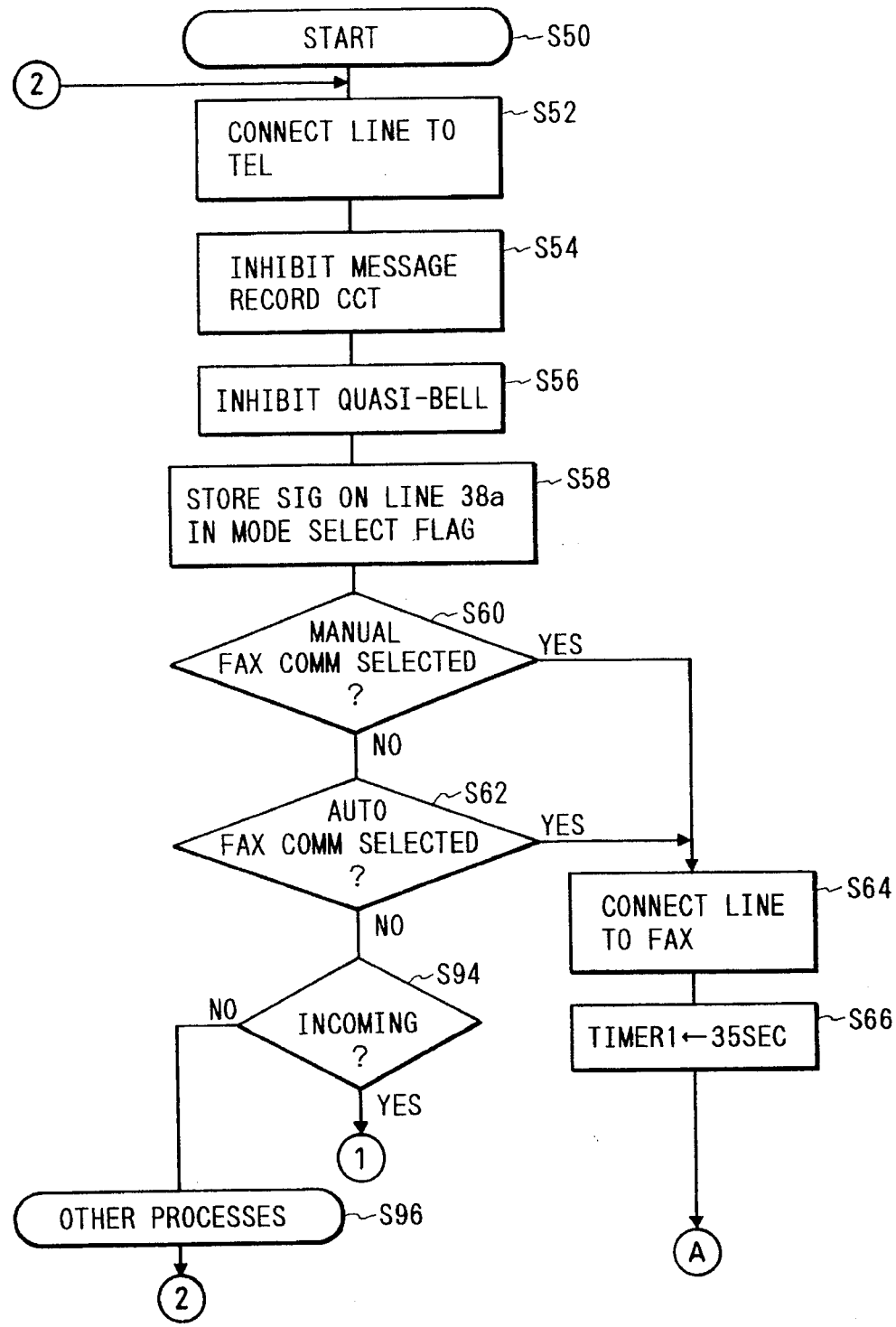

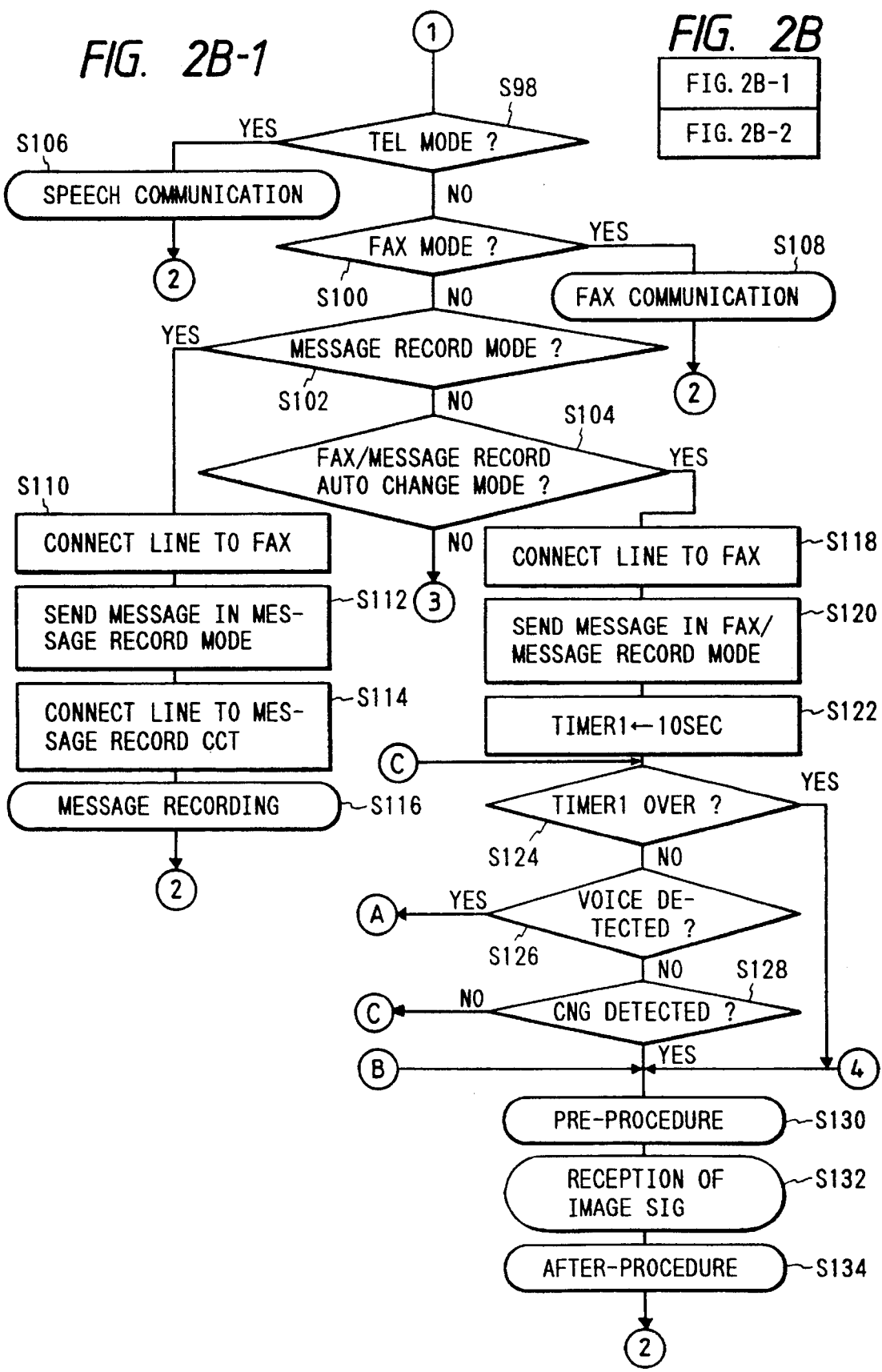

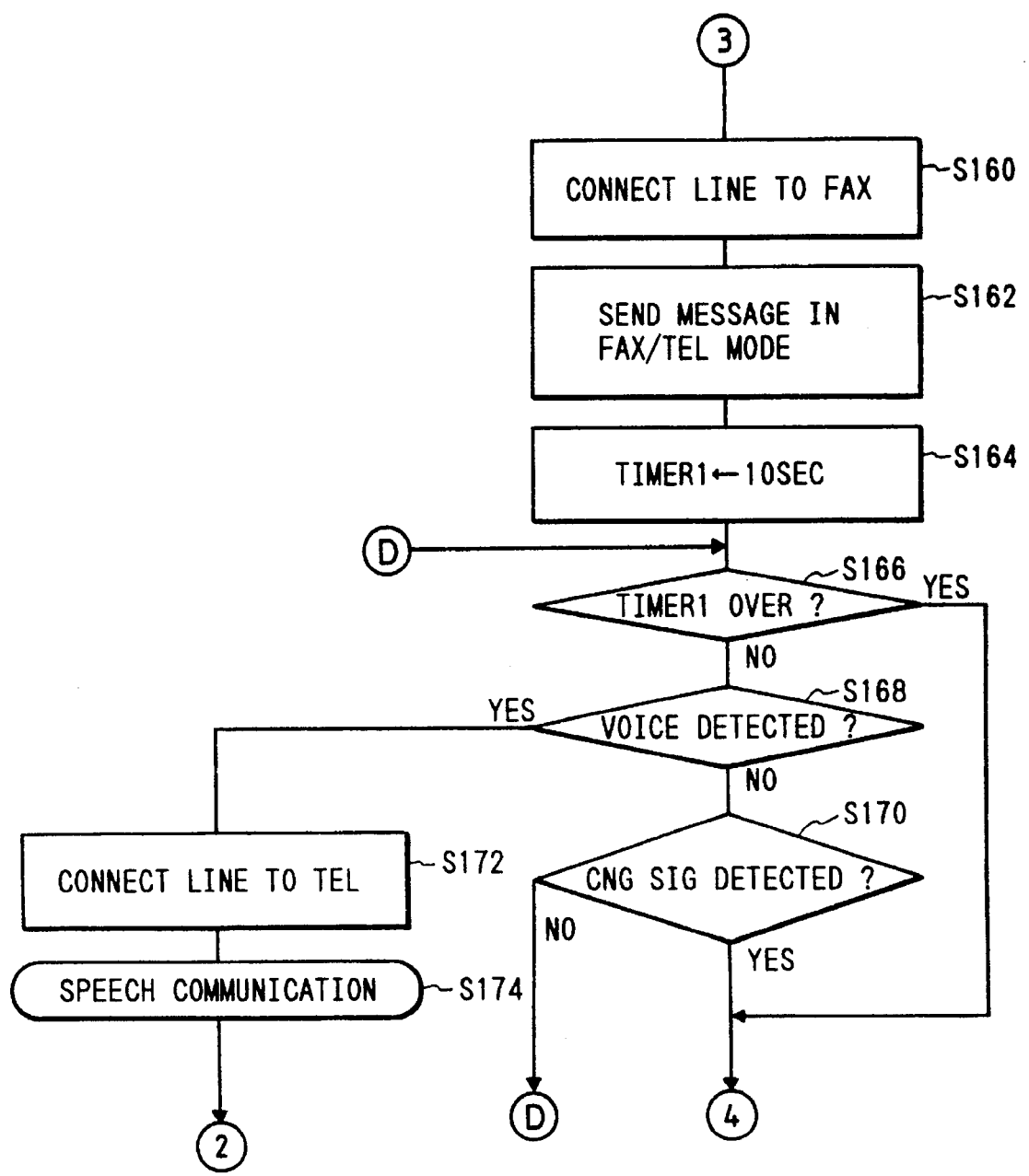

DATA TRANSMISSION OVER A COMMUNICATION LINE

This application is a continuation of application Ser. No. 07/815,869, filed Jan. 3, 1992, now abandoned, which was a continuation of application Ser. No. 07/487,130, filed Mar. 2, 1990, now abandoned.

BACKGROUND OF THE INVENTION

1. Field of the Invention

The present invention relates to a data communication apparatus and, more particularly, to a data communication apparatus for performing data communication through a line.

2. Related Background Art

In a conventional apparatus of this type, e.g., a facsimile apparatus for communicating image data, an automatic outgoing/incoming mode for automatically transmitting/receiving data, and a manual outgoing/incoming mode for manually transmitting/receiving data are known.

In an automatic incoming mode, when a calling signal is received, a line is automatically connected to a facsimile circuit to perform facsimile reception. In this case, if a calling party is a voice terminal such as a telephone set, voice communication cannot be performed.

Some conventional facsimile apparatuses having a message record function also have a voice communication function of making a voice response using a prerecorded voice message in an automatic reception mode to request facsimile transmission or to record a voice message from a calling party.

A control method executed when facsimile communication is started by a conventional manual operation will be explained below.

For example, manual transmission wherein after a telephone set is set in an off-hook state to manually call a given destination and a line is connected to the called destination, an original is set on a reader unit of a facsimile apparatus (e.g., a CCITT recommendation G3 facsimile) and a start key is depressed will be considered.

After the depression of the start key, the facsimile apparatus waits for a command sent from a receiver (destination) for a maximum of a T1 timer time (35 sec±5 sec). This command is an initial recognition signal sent from the destination, i.e., a signal (NSF/CSI/DIS signal) indicating a communication function of the receiver side.

Facsimile communication is started only when the receiver is set in, e.g., a facsimile/telephone automatic selection mode, and outputs a CNG signal within a predetermined period of time after a voice response. When the CNG signal cannot be detected within the predetermined period of time, it is determined that the destination is in communication, and an operator call is made. In this case, when a transmitter performs manual transmission, facsimile communication cannot be started. When an operator on the receiver side does not respond to the operator call, facsimile communication is disabled. Even when the operator on the receiver side responds, he or she may often not depress a start key to start a reception operation since no sound can be heard from the transmitter side.

The automatic incoming mode of the conventional facsimile apparatus will be examined in detail below. In a facsimile apparatus having a telephone/facsimile automatic selection function and a message record function, a large number of incoming modes are available as follows.

In an apparatus of this type, first, a telephone mode is available. In this mode, an incoming tone is generated using a bell circuit when an incoming signal is detected. When an operator takes up a handset, a line is connected to a transmitter side. When a calling party wants speech communication, speech communication is performed in this state. When a calling party wants facsimile communication, an operator depresses a start key.

Second, a facsimile mode is known. In this mode, when an incoming signal is detected, a facsimile apparatus performs an automatic incoming operation. In some facsimile apparatuses, a time from detection of an incoming signal until the automatic incoming operation is executed can be set. More specifically, an incoming tone is generated by a bell circuit within a setup time after detection of the incoming signal, and an incoming operation can be manually started.

Third, a message record mode is available. In this mode, when an incoming signal is detected, a voice message "This is connected to a message phone. Please leave a message to record after a beep tone. Thank you." is sent onto a line, and a calling party sends a voice message to be recorded after the beep tone.

Fourth, a facsimile/telephone automatic selection mode is available. In this mode, upon detection of an incoming signal, an apparatus responds using a message "This is ooo. Please start transmission if you want FAX communication or please talk after a beep tone if you want speech communication." When a calling party uses a facsimile apparatus, an automatic incoming operation is performed upon detection of a facsimile calling signal. If a calling party uses a telephone set, since a ringing tone is generated or a calling party's voice is sent from a loudspeaker, an operator can know that a telephone call is received. This mode belongs to the facsimile/telephone automatic selection mode.

Fifth, a facsimile/message record automatic selection mode is available. In this mode, upon detection of an incoming signal, an apparatus responds using a message "This is xxx. I am not at home now. Please start transmission if you want FAX communication or please leave a message to record after a beep tone." When a calling party uses a facsimile apparatus, an automatic incoming operation is performed. When a calling party uses a telephone, a message record mode is started.

For example, an apparatus can have the above-mentioned five modes, and these modes are selected by switches to change an operation upon detection of an incoming signal.

However, when a receiver side is set in the telephone/facsimile automatic selection mode, if a transmitter side performs manual transmission, facsimile communication cannot often be established. This is a serious drawback.

In an incoming operation mode, the telephone/facsimile/message record mode may be fixed or automatically selected as described above. In order to perform facsimile communication once the message record mode has been started, a special DTMF key is often depressed. However, a DTMF code is not standardized, and when a transmitter side does not have a DTMF transmission function, it is impossible to switch these modes.

Note that as applications associated with the telephone/facsimile automatic selection mode, U.S. Pat. No. 4,677,660, U.S. Pat. No. 4,815,121, U.S. Pat. No. 4,800,439, U.S. Pat. No. 4,932,048 and U.S. Pat. No. 4,916,607, and the like are known.

As applications associated with a speech communication/ facsimile selection mode, U.S. Pat. No. 4,353,097 and U.S. Pat. No. 4,773,080 are known.

SUMMARY OF THE INVENTION

It is an object of the present invention to improve a data communication apparatus in consideration of the above-mentioned problems.

It is another object of the present invention to provide a data communication apparatus which can reliably perform data communication even in a manual mode.

It is still another object of the present invention to provide a data communication apparatus which can reliably perform data communication by sending a recognition signal indicating a non-voice terminal in a transmission operation in a manual mode.

It is still another object of the present invention to provide a data communication system which can smoothly switch speech communication and data communication even in a manual mode.

The above and other objects of the present invention will become apparent from the following detailed description of the embodiment taken in conjunction with the accompanying drawings.

BRIEF DESCRIPTION OF THE DRAWINGS

FIG. 1 defines the two figure combination of FIGS. 1A and 1B, which together comprise a block diagram showing an arrangement of a facsimile apparatus according to an embodiment of the present invention.

DETAILED DESCRIPTION OF THE PREFERRED EMBODIMENT

Figures 2, 2A:
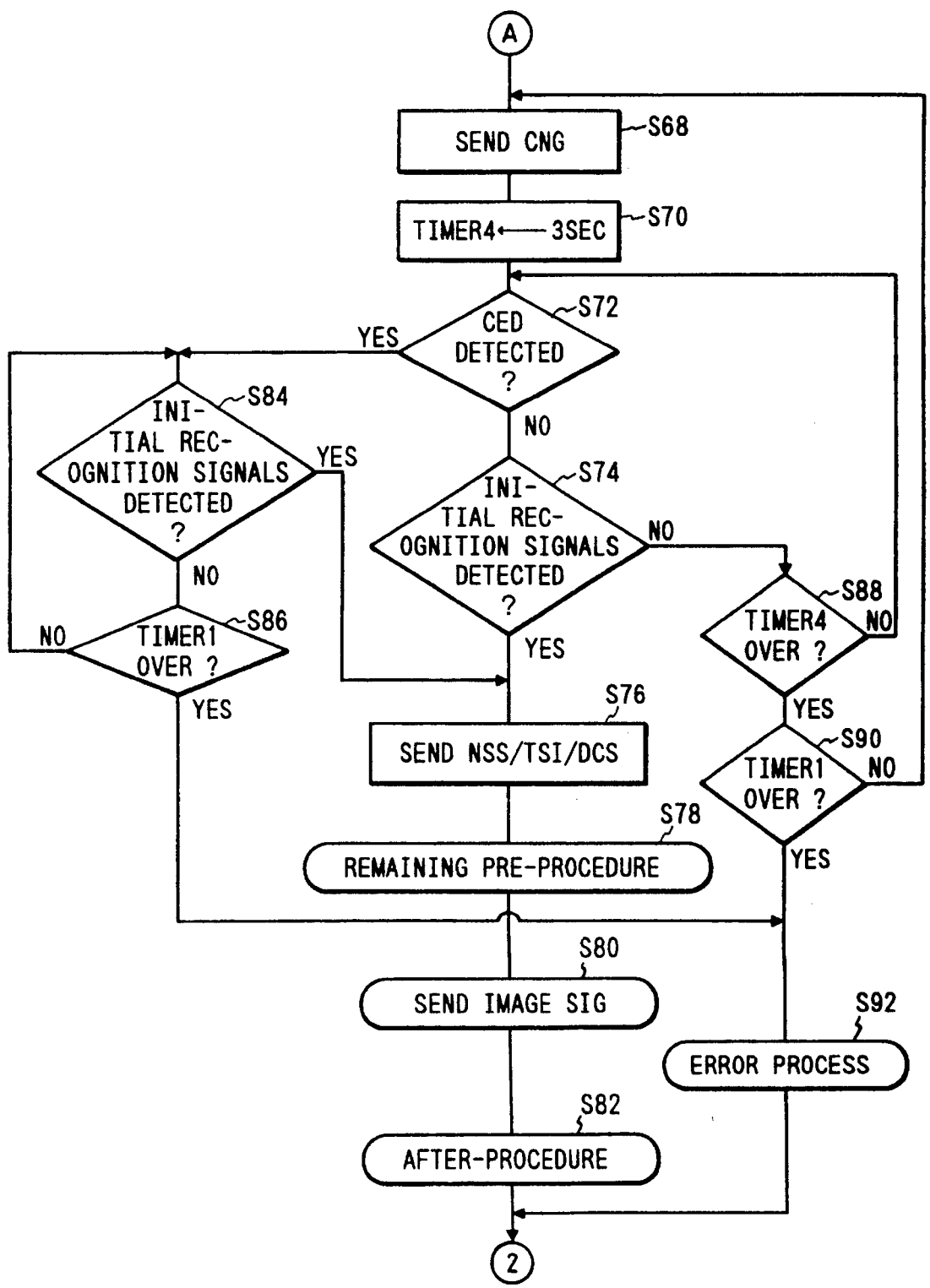
FIGS. 2A, which defines the two figure combination of FIGS. 2A-1 and 2A-2, 2B, which defines the two figure combination of 2B-1 and 2B-2 and 2C are flow charts showing control sequences of a control circuit of this embodiment.
Figures 2, 2B:
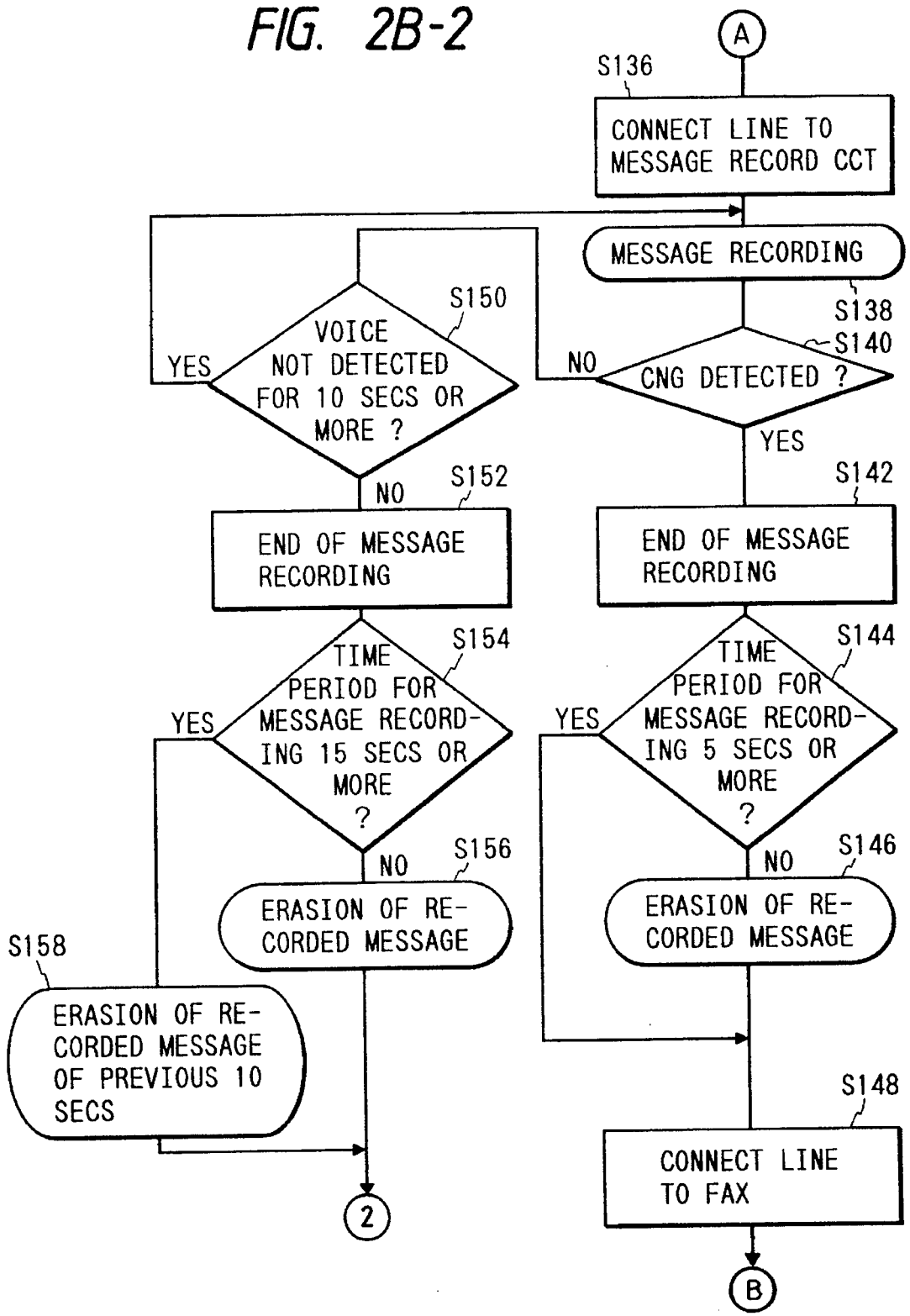

An embodiment of the present invention will be described in detail below with reference to the accompanying drawings.

In this embodiment, a facsimile apparatus having a speech communication function using a telephone set and a message record function capable of reproducing/recording a voice message will be exemplified as a data communication apparatus. However, the present invention is not limited to the facsimile apparatus but can be applied to various other data communication apparatuses such as a teletex, computer communication, and the like.

FIGS. 1A and 1B together comprise a block diagram showing an arrangement of the facsimile apparatus of this embodiment.

In FIG. 1A, an NCU (Network Control Unit) 2 connects a line to a terminal to perform connection control of a telephone exchange network in order to use a telephone network for data communication or the like, and switches a data communication path or a message record circuit to hold a loop.

A signal line 2a shown in FIG. 1A serves as a telephone line. The NCU 2 receives a signal on a signal line 42a. When this signal is "0", the NCU 2 connects the telephone line 2a to a telephone set side, i.e., to a signal line 2b. When a signal on the signal line 42a is "1", the NCU 2 connects the telephone line to a message record circuit side, i.e., connects the signal line 2a to a signal line 2c. When a signal on the signal line 42a is "2", the NCU 2 connects the telephone line to a facsimile apparatus side, i.e., connects the signal line 2a to a signal line 2d.

In a normal state, the NCU 2 connects the telephone line 2a to a telephone set 4 side. When a DC circuit of a line is open, the NCU 2 outputs a signal of a signal level "0" onto a signal line 2e; when the DC circuit is closed, it outputs a signal of a signal level "1" onto the signal line 2e.

A telephone set 4 is used for speech communication and manual line control.

A hybrid circuit 6 separates transmission signals and reception signals. More specifically, a transmission signal on a signal line 18a is sent onto the telephone line via the signal line 2d and the NCU 2. A signal sent from an apparatus on the other end of a line is input the NCU 2 and is then output onto a signal line 6a via the signal line 2d.

A modulator 8 performs modulation based on the known CCITT recommendation V21. The modulator 8 receives a procedure signal on a signal line 42b to perform modulation, and outputs modulated data onto a signal line 8a.

A reader circuit 10, depicted in FIG. 1B, sequentially reads image signals of one line in a main scanning direction from an original to be transmitted, and generates a signal train representing two values, i.e., black and white. The reader circuit 10 comprises, e.g., an image pickup element such as a CCD (charge coupled device), and an optical system. The binary signal train of black and white is output onto a signal line 10a, depicted in FIG. 1A.

An encoder circuit 12 receives read data output onto the signal line 10a, and outputs encoded (MH-encoded or MR-encoded) data onto a signal line 12a.

A modulator 14 performs modulation based on the known CCITT recommendation V27ter (differential phase modulation) or V29 (orthogonal modulation). The modulator 14 receives and modulates a signal on the signal line 12a, and outputs modulated data onto a signal line 14a.

A CNG signal send circuit 15, depicted in FIG. 1B, sends a CNG signal (1,100 Hz for 0.5 sec) onto a signal line 15a when a CNG signal send start pulse appears on a signal line 42g, and sends an end pulse onto a signal line 15b upon completion of sending of the CNG signal.

A message send circuit 16 can record three response messages, and can send recorded messages. When a send request pulse appears on a signal line 42d, shown in FIG. 1A while a signal "1" is output onto a signal line 42c, the message send circuit 16 starts sending a message to be sent to an apparatus on the other end of a line upon detection of an incoming call in a message record mode, and generates a send end pulse onto a signal line 16b upon completion of sending of the message. When the send request signal appears on the signal line 42d while a signal "2" is output onto the signal line 42c, the circuit 16 starts sending of a message to be sent to an apparatus on the other end of a line upon detection of an incoming signal in a facsimile/message record automatic selection mode, and generates a send end pulse onto the signal line 16b upon completion of sending of the message.

When the send request signal appears on the signal line 42d while a signal "3" is output onto the signal line 42c, the message send circuit 16 starts sending a message to be sent to an apparatus on the other end of a line upon detection of an incoming signal in a facsimile/telephone automatic selection mode, and generates a send end pulse onto the signal line 16b upon completion of sending of the message. Messages "1", "2", and "3" are recorded using a microphone 33. This recording method is known to those who are skilled in the art, and a detailed description thereof will be omitted.

An adder circuit 18 receives and adds signals on the signal lines 8a, 14a, 15a, and 16a, and outputs the sum onto the signal line 18a.

A CNG signal detect circuit 19 monitors a CNG signal during a message record operation. The CNG signal detect circuit 19 receives a signal output onto the signal line 2c. When the circuit 19 detects only a 1,100-Hz signal component, it outputs a signal of a signal level "1" onto a signal line 19a; otherwise, it outputs a signal of signal level "0" onto the signal line 19a.

A demodulator 20 performs demodulation based on the known CCITT recommendation V21. The demodulator 20 receives a signal on the signal line 6a to perform V21 demodulation, and outputs demodulated data onto a signal line 20a.

A voice detect circuit 21 receives a signal on the signal line 2c. When the detect circuit 21 does not detect a voice signal, it outputs a signal of signal level "0" onto a signal line 21a; when it detects the voice signal, it outputs a signal of signal level "1" onto the signal line 21a.

A demodulator 22 performs demodulation based on the known CCITT recommendation V27ter (differential phase modulation) or V29 (orthogonal modulation). The demodulator 22 receives and demodulates a signal on the signal line 6a, and outputs demodulated data onto a signal line 22a.

A decoder circuit 24 receives the demodulated data output onto the signal line 22a, and outputs decoded (MH-decoded or MR-decoded) data onto a signal line 24a.

A record circuit 26, shown in FIG. 1B, receives a signal output onto the signal line 24a, shown in FIG. 1A, and sequentially performs recording in units of lines.

A tonal signal detect circuit 28 receives a signal on the signal line 6a. The detect circuit 28 outputs a signal "0" onto a signal line 28a when it detects no tonal signal; a signal "1" upon detection of a 462-Hz signal; a signal "2" upon detection of a 1,100-Hz signal; a signal "4" upon detection of a 1,650-Hz signal; and a signal "5" upon detection of a 2,100-Hz signal.

A voice detect circuit 30 receives a signal output onto the signal line 6a. When the detect circuit 30 does not detect a voice signal, it outputs a signal of signal level "0" onto a signal line 30a; when it detects a voice signal, it output a signal of signal level "1" onto the signal line 30a.

A message record circuit 32 is disabled when a signal "0" is output into a signal line 42e. When a signal "1" is output onto the signal line 42e, the record circuit 32 records a voice signal output to a signal line 33a, and when a signal "2" is output onto the signal line 42e, it outputs recorded information onto a signal line 32a. A tape position is managed by a signal line 42f.

The microphone 33 receives a voice to be recorded, and the voice signal is output onto the signal line 33a.

A loudspeaker circuit 34 receives a signal on the signal line 32a.

A start key depression detect circuit 35, shown in FIG. 1B, generates a pulse onto a signal line 35a upon depression of a start key.

An incoming mode select key 36 is used to select an incoming mode. Every time this key is depressed, a pulse is generated onto a signal line 36a.

An incoming mode display circuit 38 makes a display indicating that a telephone mode is set in a power-on state.

Thereafter, every time a pulse appears on the signal line 36a, the display circuit 38 changes its display to a facsimile mode, a message record mode, a facsimile/message record automatic selection mode, and a facsimile/telephone automatic selection mode. When a pulse is generated onto the signal line 36a again, a display of the telephone mode is made. Thereafter, these mode displays are cyclically repeated.

When the display circuit 38 displays the telephone mode, it outputs a signal "1" onto a signal line 38a. Similarly, when the display circuit 38 displays the facsimile mode, the message record mode, the facsimile/message record automatic selection mode, and the facsimile/telephone automatic selection mode, it respectively outputs signals "2", "3", "4", and "5" onto the signal line 38a.

An original sheet detect circuit 39 detects whether or not an original sheet is set on an original table. When an original sheet is set on the original table, the detect circuit 39 outputs a signal of signal level "1" onto a signal line 39a; otherwise, it outputs a signal of signal level "0" onto the signal line 39a.

A quasi-bell ringing circuit 40 generates a quasi-bell tone for calling an operator. The ringing circuit 40 does not generate a quasi-bell tone when a signal of signal level "0" is output onto a signal line 42g, and it generates a quasi-bell tone when a signal of a signal level "1" is output onto the signal line 42g.

A facsimile communication key depression detect circuit 41 generates a pulse onto a signal line 41a upon depression of a facsimile communication key.

A control circuit 42 comprises a microprocessor, a ROM (Read-Only Memory), a RAM (Random-Access Memory), and the like. The control circuit 42 controls the above-mentioned circuits in accordance with programs (to be described later) stored in the ROM.

The operation of the above arrangement will be described below.

The facsimile apparatus, the block diagram depicted by FIGS. 1A and 1B, can switch the following five modes as an automatic incoming operation. An operator selects one of the five modes upon operation of keys on an operation unit.

The five modes include the telephone mode, the facsimile mode, the message record mode, the facsimile/message record automatic selection mode, and the facsimile/telephone automatic selection mode.

In the telephone mode, an incoming tone is generated upon reception of an incoming signal, and when a handset is hooked off, a line is connected to a transmission side. When a calling party wants to talk, speech communication is performed in this state. When a calling party wants facsimile communication, an operator depresses a start key.

In the facsimile mode, the facsimile apparatus performs an automatic incoming operation upon detection of an incoming signal to perform facsimile communication like in a conventional automatic incoming operation.

In the message record mode, when an incoming signal is detected, such a voice message as "This is connected to a message phone. Please leave a message to record after a beep tone. Thank you." is sent onto a line, and a calling party sends a voice message to be recorded after the beep tone.

In the facsimile/message record automatic selection mode, upon detection of an incoming signal, an apparatus responds using a message "This is xxx. I am not at home now. Please start transmission if you want FAX communication or please leave a message to record after a beep tone." When a calling party uses a facsimile apparatus, an automatic incoming operation is performed. When a calling party uses a telephone set, a message record mode is started. When the message record mode is started, a CNG signal (recognition signal indicating a non-voice terminal) is continuously monitored and the message recording is ended upon detection of the CNG signal. For example, when a recording operation is completed within 5 sec, the recorded content is erased, and thereafter, facsimile communication is started. When no voice is detected over 10 sec, the message recording is ended.

In the facsimile/telephone automatic selection mode, upon detection of an incoming signal, an apparatus responds using such a message as "This is ooo. Please start transmission if you want FAX communication or please talk after a beep tone if you want speech communication." When a calling party uses a facsimile apparatus, an automatic incoming operation is performed. When a calling party uses a telephone set, a quasi-bell tone is generated.

When a start key is depressed in an off-hook state and in a state wherein original sheets are set, a CNG signal is sent. After sending of the CNG signal, initial recognition signals and a CED signal sent from a receiver of a called party is detected for 3 sec.

When the CED signal sent from the receiver is detected within 3 sec, sending of the CNG signal is stopped, and only reception of the initial recognition signals is performed. When the initial recognition signals sent from the receiver are detected within 3 sec, NSS/TSI/DCS signals are sent. When neither the initial identification signals nor the CED signal sent from the receiver are detected within 3 sec, the CNG signal is sent. When the initial recognition signals sent from the facsimile receiver by the called party cannot be received within 35 sec after sending of the CNG signal is started, a pre-procedure error occurs.

The control sequences of the control circuit 42 for performing the above-mentioned operations are described by the flowcharts shown in FIGS. 2A-1, 2A-2, 2B-1, 2B-2 to 2C. The flowchart sequences shown in FIGS. 2A-1, 2A-2, 2B-1, 2B-2 and 2C are stored in the ROM as control programs of the control circuit 42.

In step S52 in FIG. 2A-1, after commencement of the process (S50), a signal "0" is output onto the signal line 42a to connect the telephone line to the telephone set side.

In step S54, a signal "0" is output onto the signal line 42e to disable the message record circuit 32.

In step S56, a signal of signal level "0" is output onto the signal line 42g to inhibit generation of a quasi-bell tone.

In step S58, a signal output onto the signal line 38a is received, and is stored in a mode select flag.

In step S60, it is checked if a manual facsimile communication mode is selected. More specifically, it is checked if a start key is depressed in an off-hook state and in a state wherein original sheets are set. If YES in step S60, the flow advances to step S64; otherwise, the flow advances to step S62.

In step S62, it is checked if an automatic facsimile communication mode is selected by a one-touch dial or an abbreviated dial. If YES in step S62, the flow advances to step S64 in the same manner as in the manual facsimile communication mode; otherwise, the flow advances to step S94.

In step S64, a signal "2" is output onto the signal line 42a to connect the telephone line to the facsimile apparatus side.

In step S66, 35 sec are set in a timer 1.

In step S68, a CNG signal (also called "standard tone signal" at times herein) send start pulse is output onto the signal line 42g, and a CNG signal is sent onto the line.

In step S70, 3 sec are set in a timer 4.

In step S72, it is checked if a CED signal is detected. If YES in step S72, the flow advances to step S84; otherwise, the flow advances to step S74.

In step S74, it is checked if initial recognition signals (NSF/CSI/DIS) are detected. If YES in step S74, the flow advances to step S76, and NSS/TSI/DCS signals for designating a transmission mode are sent. In step S78, the remaining pre-procedure is executed, and in step S80, an image signal is sent. Thereafter, a communication after-procedure is executed in step S82. However, if NO in step S74, the flow advances to step S88.

In step S88, it is checked if the timer 4 is over. If it is determined in step S88 that the timer 4 is not over, the flow returns to step S72.

In step S90, it is checked if the timer 1 is over. If the timer 1 is over, error processing is executed in step S92. If the timer 1 is not over, the flow advances to step S68.

In step S94, it is checked if an incoming signal is detected. If YES in step S94, the flow advances to step S98; otherwise, other processing operations are executed in step S96.

In steps S98 to S104, a mode set flag is checked to determine an incoming mode. If the incoming mode is the telephone mode, the flow advances to speech communication in step S106; if the facsimile mode, to facsimile communication in step S108; if the message record mode, to step S110; if the facsimile/message record automatic selection mode, to step S118; and if the facsimile/telephone automatic selection mode, to step S160.

In step S118, a signal "2" is output onto the signal line 42a to connect the telephone line to the facsimile apparatus side.

In step S120, after a signal "2" is output onto the signal line 42c, a send request pulse is generated onto the signal line 42d to send a message in the facsimile/message record automatic selection mode to an apparatus on the other end of the line. When a send end pulse appears on the signal line 16b, the flow advances to step S122.

In steps S122 to S128, it is determined if a calling party wants to perform facsimile or speech communication. If the calling party wants facsimile communication, the flow advances to step S130; otherwise, the flow advances to step S136.

In this case, in step S122, 10 sec are set in the timer 1. When a CNG signal is detected within 10 sec, facsimile communication is performed. When a voice signal is detected within 10 sec, speech communication is started. When neither the CNG nor voice signals are detected within 10 sec, the facsimile communication is started. In this case, however, the speech communication may be started. The CNG signal is detected as follows. That is, a signal on the signal line 28a is received and checked to determine if a CNG signal is detected. In this embodiment, a CNG signal is output even when a calling party executes manual transmission. Therefore, facsimile communication can be performed by selecting modes upon detection of the CNG signal.

In step S130, a communication pre-procedure is executed.

In step S132, an image signal is sent.

In step S134, a communication after-procedure is executed.

In step S136, a signal "1" is output onto the signal line 42a to connect the telephone line to the message record circuit.

In step S138, a signal "1" is output onto the signal line 42e to start message recording.

In step S140, it is checked if a CNG signal is detected. In this case, the CNG signal is detected receiving a signal output onto the signal line 19a. If the CNG signal is detected, the flow advances to step S142; otherwise, the flow advances to step S150.

In step S142, a signal "0" is output onto the signal line 42e to end message recording.

In step S144, it is checked if a message recording time exceeds 5 sec. If NO in step S144, it is determined that the facsimile/message record automatic selection operation malfunctions, and the content recorded in step S146 is erased.

In step S148, a signal "2" is output onto the signal line 42a to connect the telephone line to the facsimile apparatus side.

In step S150, it is checked if no voice signal has been detected over 10 sec. This checking operation is performed by receiving a signal output onto the signal line 21a. If YES in step S150, the flow advances to step S152; otherwise, the flow advances to step S138.

In step S152, a signal "0" is output onto the signal line 42e to end the message recording.

In step S154, it is checked if a message recording time exceeds 15 sec. If YES in step S154, the flow advances to step S158, and only the content of the recorded message of previous 10 sec is erased. If NO in step S154, the recorded message is erased in step S156.

In step S160 in FIG. 2C, a signal "2" is output onto the signal line 42a to connect the telephone line to the facsimile apparatus side.

In step S162, after a signal "3" is output onto the signal line 42c, a send request pulse is output onto the signal line 42d to send a message in the facsimile/telephone automatic selection mode. When a send end pulse is generated on the signal line 16b, the flow advances to step S164.

In steps S164 to S170, it is checked if a calling party wants to perform facsimile or speech communication, in the same manner as in steps S122 to S128. If the calling party wants facsimile communication, the flow advances to step S130; otherwise, the flow advances to step S172. In step S172, a signal "1" is output onto the signal line 42a to connect the telephone line to the telephone set side.

In step S174, speech communication is performed between the transmitter and the receiver.

According to the above-mentioned embodiment, even when a receiver is set in a telephone/facsimile automatic selection mode, facsimile communication can be started in response to a CNG signal. Therefore, the facsimile communication can be reliably started.

More specifically, if it is determined that a calling station is a non-voice terminal even after the receiver side has been set in the message record mode, facsimile communication can be started. In this case, if a message recording time is shorter than a predetermined period of time, the recorded content is erased. Thus, a recorded content can be prevented from being wastefully held.

As described above, even if a receiving station has been switched to the message record mode, a calling station can start transmission by a standard manual operation, i.e., by setting original sheets and depressing a start key like in a normal procedure. Then, a CNG signal is sent from the CNG signal send circuit 15. Upon detection of this signal by the receiver side, the message record mode can be switched to the facsimile reception mode.

For this reason, a transmitter side need not perform a complicated operation such as sending of a DTMF signal, and can perform facsimile communication by standard transmission processing without wasting connected lines. By using the standard processing, facsimile communication can be reliably started regardless of a difference in manufacturers since transmission/reception of a DTMF signal or a non-standard format procedure signal need not be used.

In the telephone/message record automatic selection mode, if a voice signal is erroneously detected due to a noise component on a line regardless of the facsimile communication mode selected by a transmitter and the message record mode is started, a content recorded at that time is erased.

This embodiment does not consider a case wherein when an incoming mode is set in the message record mode, the message record mode is switched to the facsimile communication mode. However, this operation may be executed. More specifically, in the message record mode, a CNG signal is monitored, and when the CNG signal is detected, the message record mode is stopped to start the facsimile communication.

In the above embodiment, when a start key is depressed in an off-hook state and in a state wherein original sheets are set, i.e., when manual transmission is selected, a CNG signal is sent. However, when a specific key such as a facsimile communication key is depressed in an off-hook state, a CNG signal may be sent. In this case, polling reception is also available. When a start key is depressed within 5 sec after a specific key such as a facsimile communication key is depressed, a CNG signal may be sent. In this case, polling reception can be performed.

The facsimile apparatus has been exemplified. However, the present invention is not limited to apparatuses for transmitting/receiving image data but may be applied to various other apparatuses for transmitting/receiving other data.

The present invention is not limited to the above embodiment, and various changes and modifications may be made within the spirit and scope of the invention.

What is claimed is:

1. A data transmission apparatus located at one end of a communication line for performing data transmission through the communication line, said apparatus comprising:

manual instruction means for issuing a manual instruction for starting data transmission in an off-hook state of the communication line;

means for transmitting to the communication line a standard tone signal indicating that said apparatus is operating as a non-voice terminal, in response to the manual instruction issued by said manual instruction means; and means, responsive to an initial recognition signal indicative of a data communication function received from the communication line after transmission of the standard tone signal, for performing data transmission in accordance with an automatic procedure.

2. An apparatus according to claim 1, further comprising detection means for detecting whether or not data to be transmitted is set, wherein said manual instruction means issues the manual instruction in the off-hook state of the communication line when the data to be transmitted is set.

3. An apparatus according to claim 1, wherein said performing means performs image data transmission.

4. An apparatus according to claim 1, further comprising a telephone set for speech communication, and means for selectively connecting one of said telephone set and said data transmission means to the communication line.

5. An apparatus according to claim 1, wherein the standard tone signal includes a CNG signal.

6. A data transmission apparatus located at one end of a communication line for performing data transmission through the communication line, said apparatus comprising:

a telephone set for speech communication;

data transmission means for performing data transmission through the communication line in accordance with a predetermined communication procedure;

means for selectively connecting one of said telephone set and said data transmission means to the communication line;

manual instruction means for issuing a manual instruction for starting data transmission in a condition where said telephone set is connected to the communication line;

means for sending a standard tone signal indicating that said apparatus is operating as a non-voice terminal; and control means for controlling said connecting means so as to connect said data transmission means to the communication line and for causing said sending means to send the standard tone signal to the communication line in response to the manual instruction, said control means further being responsive to receipt of an initial recognition signal indicative of a data communication function received from the communication line after the standard tone signal has been sent for causing said data transmission means to automatically perform the data transmission.

7. An apparatus according to claim 6, wherein the standard tone signal includes a CNG signal.

8. An apparatus according to claim 6, wherein the data transmission includes image data transmission.

9. A method for data transmission through a communication line, comprising the steps taken at one end of the communication line of:

issuing a manual instruction for starting data transmission in an off-hook state of the communication line;

sending to the communication line a standard tone signal indicating a non-voice terminal operating at the one end of the communication line in response to the manual instruction; and responsive to receipt of an initial recognition signal indicative of a data communication function received from the communication line after the standard tone signal has been sent, performing data transmission in accordance with an automatic procedure.

10. A method according to claim 9, further comprising the step of detecting whether or not data to be transmitted is set, wherein in said issuing step, the manual instruction is issued in the off-hook state of the communication line when the data to be transmitted is set.

11. A method according to claim 9, wherein in the performing step, image data transmission is performed.

12. A method according to claim 9, wherein the standard tone signal includes a CNG signal.

13. A method according to claim 9, further comprising the step of switching the communication line from a telephone set side to a data transmission unit side so as to connect said data transmission unit to the communication line and disconnect said telephone set side from the communication line, in response to the manual instruction.

* * * * *